(12) United States Patent
Patterson et al.

(10) Patent No.: US 7,506,702 B1
(45) Date of Patent: Mar. 24, 2009

(54) METHOD AND APPARATUS FOR DISPOSAL OF CUTTINGS

(75) Inventors: Michael Patterson, Morgan City, LA (US); Edward L. Shearer, Metairie, LA (US)

(73) Assignee: Coastal Boat Rentals, Inc., Morgan City, LA (US)

( * ) Notice: Subject to any disclaimer, the term of this patent is extended or adjusted under 35 U.S.C. 154(b) by 145 days.

(21) Appl. No.: 11/324,142

(22) Filed: Dec. 29, 2005

Related U.S. Application Data

(60) Provisional application No. 60/640,581, filed on Dec. 30, 2004.

(51) Int. Cl.
*E21B 21/06* (2006.01)
*B63B 35/28* (2006.01)

(52) U.S. Cl. .............................. 175/66; 175/5; 405/210; 114/26; 166/335; 166/352

(58) Field of Classification Search .................. 166/66, 166/5; 175/335, 352; 405/210; 114/26, 114/248
See application file for complete search history.

(56) References Cited

U.S. PATENT DOCUMENTS

| | | | |
|---|---|---|---|
| 2,207,514 A * | 7/1940 | Haldeman ..................... 261/21 |
| 3,907,147 A | 9/1975 | Goobeck | |
| 5,564,509 A | 10/1996 | Dietzen | |
| 5,964,304 A * | 10/1999 | Morrison et al. ............... 175/38 |
| 5,971,084 A * | 10/1999 | Dietzen ........................ 175/66 |
| 6,106,733 A * | 8/2000 | Wood .......................... 210/774 |
| 6,179,070 B1 * | 1/2001 | Dietzen ........................ 175/66 |
| 6,345,672 B1 | 2/2002 | Dietzen | |
| 6,585,115 B1 | 7/2003 | Reddoch et al. | |
| 6,640,470 B2 | 11/2003 | Chesner et al. | |
| 2004/0188433 A1 * | 9/2004 | Morales et al. ............... 220/1.5 |

* cited by examiner

*Primary Examiner*—Jennifer H Gay
*Assistant Examiner*—Brad Harcourt
(74) *Attorney, Agent, or Firm*—Garvey, Smith, Nehrbass & North, L.L.C.; Brett A. North

(57) ABSTRACT

A method and apparatus for disposing of drill cuttings 500 from an oil and/or gas well drilling platform 510, comprising (a) transporting the drill cuttings 520 to a cuttings collection area 530 on the platform 510; (b) providing a barge 10, the barge 10 having at least one storage area 30, a cover 100 operably connected to the at least one storage area 30, and covering the at least one storage area 30; (c) placing the cover 100 in a first open state so that cuttings 500 can be placed in the at least one storage area 30; (d) transporting the drill cuttings 500 from the cuttings collection area 530 to the at least one storage area of the barge 10; (e) placing the cover 100 in a closed state so that the cuttings 520 in the storage area 30 of the barge 10 are contained; (f) transporting the barge 10 from the drilling platform 510 to a collection site 540; (g) placing the cover 100 in a second open state so that the cuttings 520 in the storage area 30 can be removed; and (h) removing the cuttings 520 from the storage area 30.

22 Claims, 10 Drawing Sheets

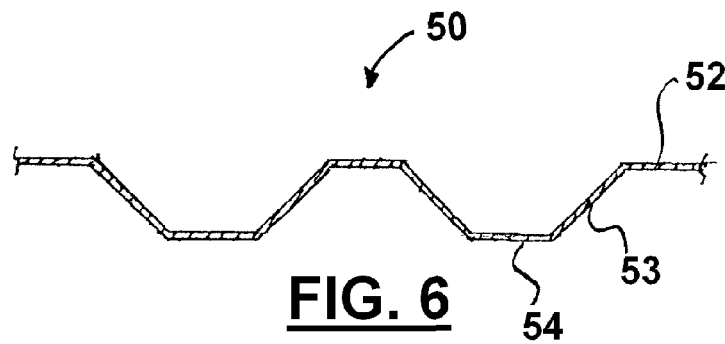
FIG. 6
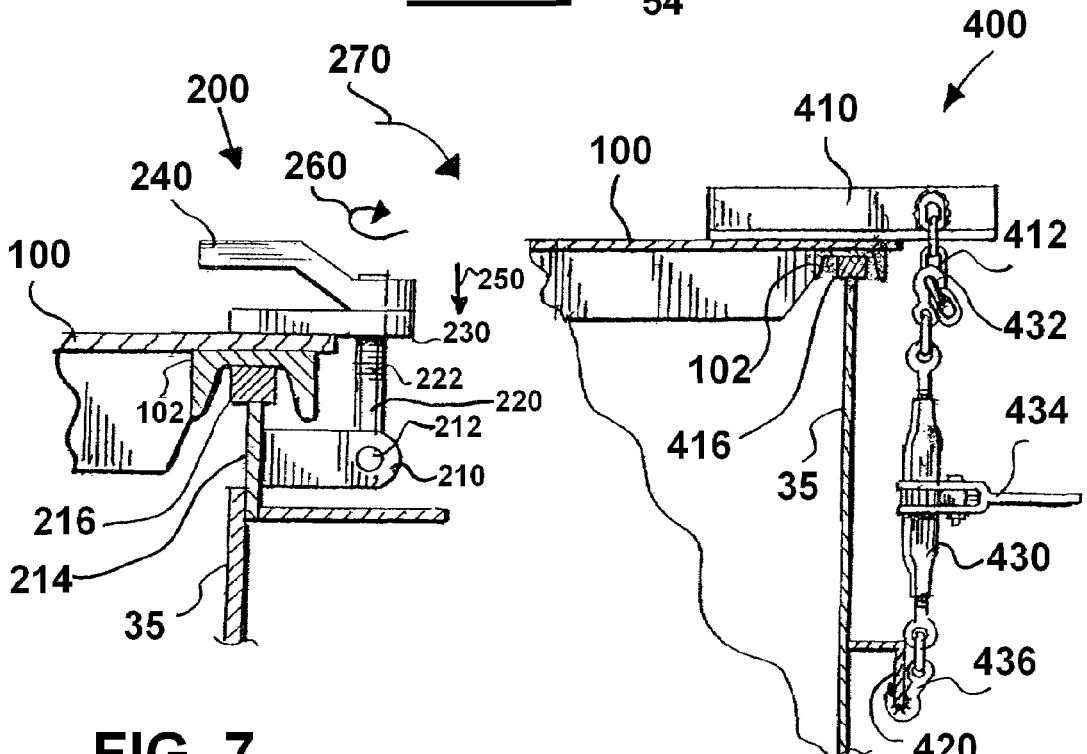
FIG. 7
FIG. 7A
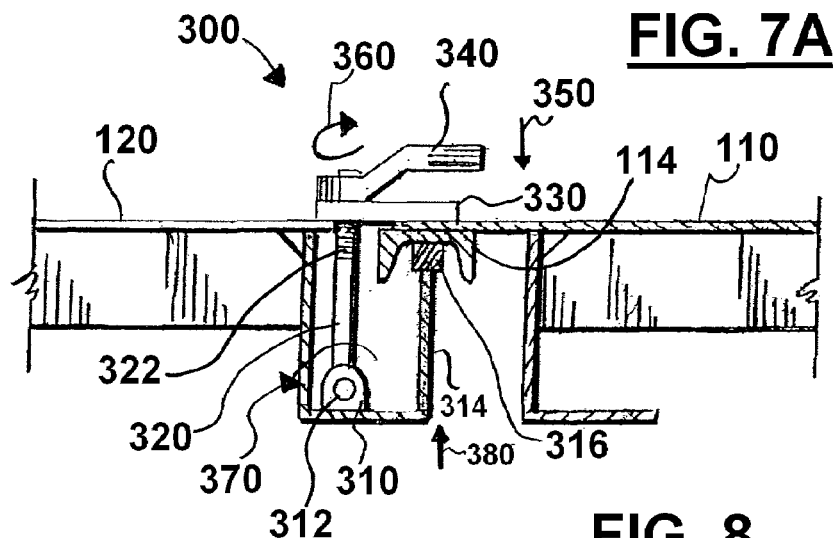
FIG. 8

METHOD AND APPARATUS FOR DISPOSAL OF CUTTINGS

CROSS-REFERENCE TO RELATED APPLICATIONS

Priority of U.S. Patent Application Ser. No. 60/640,581, filed Dec. 30, 2004, is hereby claimed, and such application is incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND

The present invention relates to the disposal of the cuttings from oil and gas well drilling, and more particularly to an improved method and apparatus for the disposal of cuttings generated during drilling of an oil and gas well. More particularly, the present invention relates to a method and apparatus for disposal of cuttings generated during the drilling of an oil and gas well using a barge wherein an improved configuration enhances the storage, transportation, and ultimate disposal of cuttings.

In the drilling of oil and gas wells, a drill bit is used to dig many thousands of feet into the earth's crust. Oil rigs typically employ a derrick that extends above the well drilling platform which can support joint after joint of drill pipe connected end to end during the drilling operation. As the drill bit is pushed farther and farther into the earth, additional pipe joints are added to the ever lengthening "string" or "drill string." The drill pipe or drill string thus comprises a plurality of joints of pipe, each of which has an internal, longitudinally extending bore for carrying fluid drilling mud from the well drilling platform through the drill string and to a drill bit supported at the lower or distal end of the drill string.

Drilling mud lubricates the drill bit and carries away well cuttings generated by the drill bit as it digs deeper. The cuttings are carried in a return flow stream of drilling mud through the well annulus and back to the well drilling platform at the earth's surface. When the drilling mud reaches the surface, it is contaminated with small pieces of shale and rock which are known in the industry as well cuttings or drill cuttings.

Well cuttings have in the past been separated from the reusable drilling mud with commercially available separators that are know as "shale shakers." Some shale shakers are designed to filter coarse material from the drilling mud while other shale shakers are designed to remove finer particles from the drilling mud. After separating well cuttings therefrom, the drilling mud is returned to a mud pit where it can be supplemented and/or treated prior to transmission back into the well bore via the drill string and drill bit to repeat the process.

The disposal of the separated shale and cuttings is a complex environmental problem. Drill cuttings contain not only the mud product which would contaminate the surrounding environment, but also can contain oil that is particularly hazardous to the environment, especially when drilling in a marine environment.

Traditional methods of cuttings disposal have been by individual storage tanks, dumping, bucket transport, cumbersome conveyor belts, and washing techniques that require large amounts of water. Adding water creates additional problems of added volume and bulk, messiness, and transport problems. Installing conveyors requires major modification to the rig area and involves many installation hours and very high cost.

In the Gulf of Mexico for example, there are hundreds of drilling platforms that drill for oil and gas by drilling into the subsea floor. These drilling platforms can be in many hundreds of feet of water. In such a marine environment, the water is typically crystal clear and filled with marine life that cannot tolerate the disposal of drill cuttings waste such as that containing a combination of shale, drilling mud, oil, and the like. Therefore, there is a need for a simple, yet workable solution to the problem of disposing of oil and gas well cuttings in an offshore marine environment and in other fragile environments where oil and gas well drilling occurs.

Open top barges are not approved by the Coast Guard for use in the Gulf of Mexico because of the risk of discharges into the environment.

Prior art tank systems have included tanks with hatch openings into which drill cuttings can be placed. These prior art tanks also have attachments for enabling lift lines to be affixed to the tank so that it can be transported to and from offshore platforms and emptied when full. Further examples of these tanks are shown in one or more of the following U.S. Pat. Nos. 5,971,084; 5,564,509; and 5,402,857, which are each incorporated herein by reference. Although these tanks address the risk of discharge of drill cuttings into the environment, the tanks suffer from the disadvantage that they must be individually filled and emptied. Additionally, the tanks must be loaded onto the transporting vessel before being filled with cuttings, transported to the disposal site, off loaded from the transported vessel, and then cuttings from each tank are unloaded individually. This is a time consuming and cost prohibitive process.

There is a need for a system which allows fast and economical transport and disposal of drill cuttings from a drilling rig.

While certain novel features of this invention shown and described below are pointed out in the annexed claims, the invention is not intended to be limited to the details specified, since a person of ordinary skill in the relevant art will understand that various omissions, modifications, substitutions and changes in the forms and details of the device illustrated and in its operation may be made without departing in any way from the spirit of the present invention. No feature of the invention is critical or essential unless it is expressly stated as being "critical" or "essential."

BRIEF SUMMARY

The apparatus of the present invention solves the problems confronted in the art in a simple and straightforward manner. In one embodiment is provided an improved method and apparatus for storage, transportation, and disposal of cuttings.

In one embodiment an improved barge is provided which includes a removable cover.

The drawings constitute a part of this specification and include exemplary embodiments to the invention, which may be embodied in various forms.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 6 is an enlarged sectional view of the interior support shown in circle 6 of FIG. 1;

FIG. 7 is a side view of a locking unit;

FIG. 7A is a side view of an alternative locking unit;

FIG. 8 is a side view of a locking unit;

DETAILED DESCRIPTION

Detailed descriptions of one or more preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriate system, structure or manner.

Figure 1:
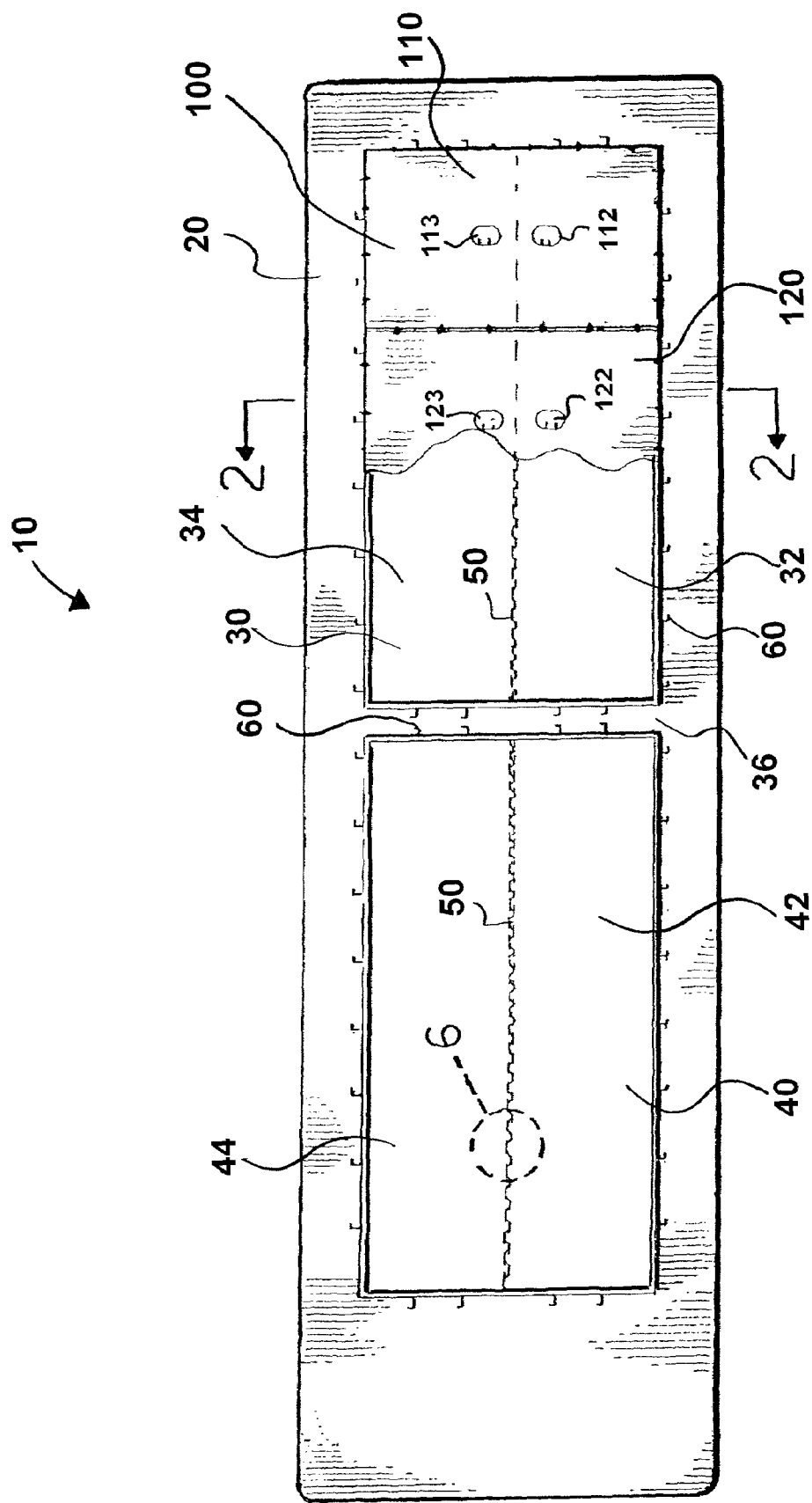
FIG. 1 is a top schematic view of a barge which can be used in one embodiment.
Figure 2:
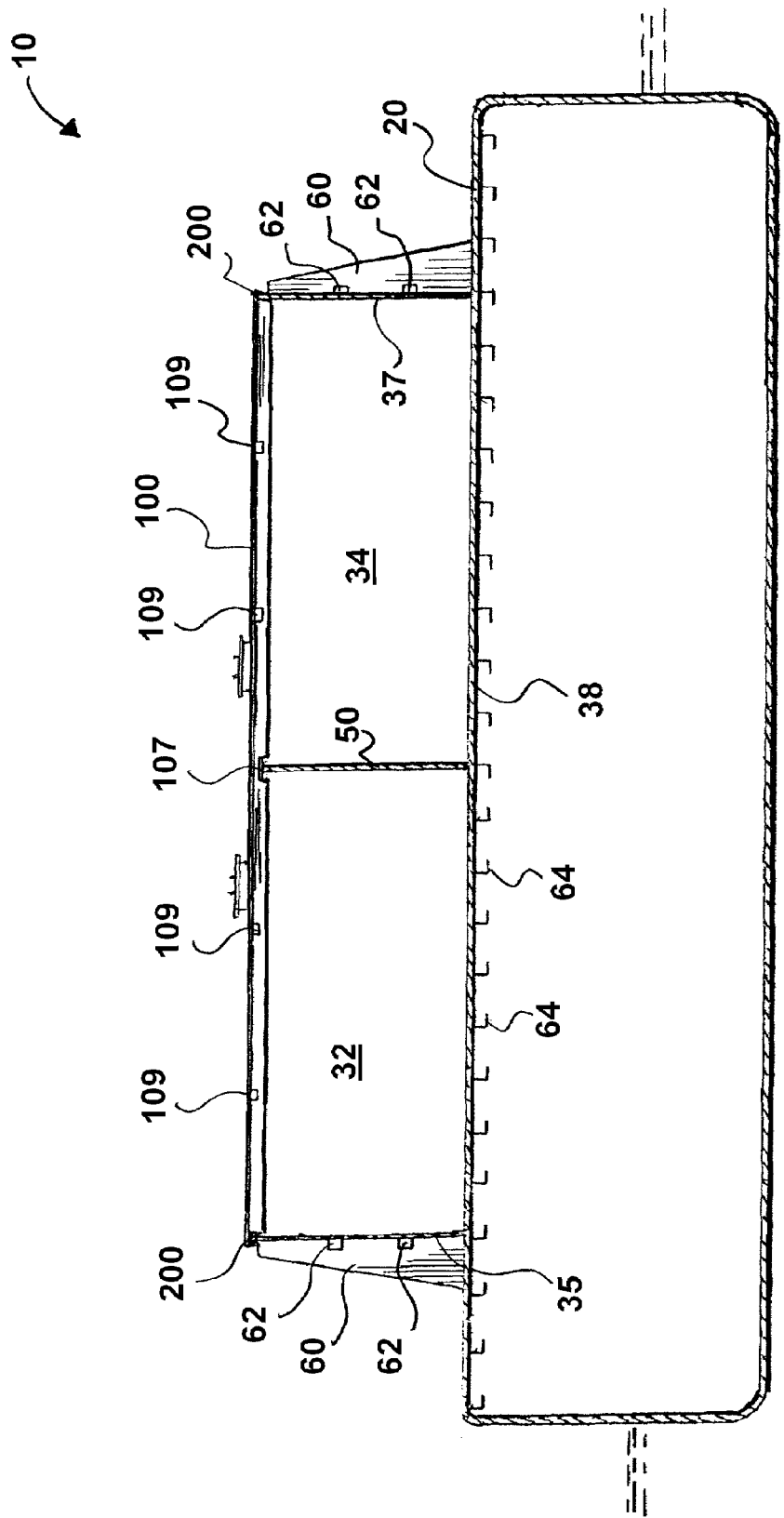
FIG. 2 is a sectional view taken along the line 2-2 of FIG. 1.
Figure 3:
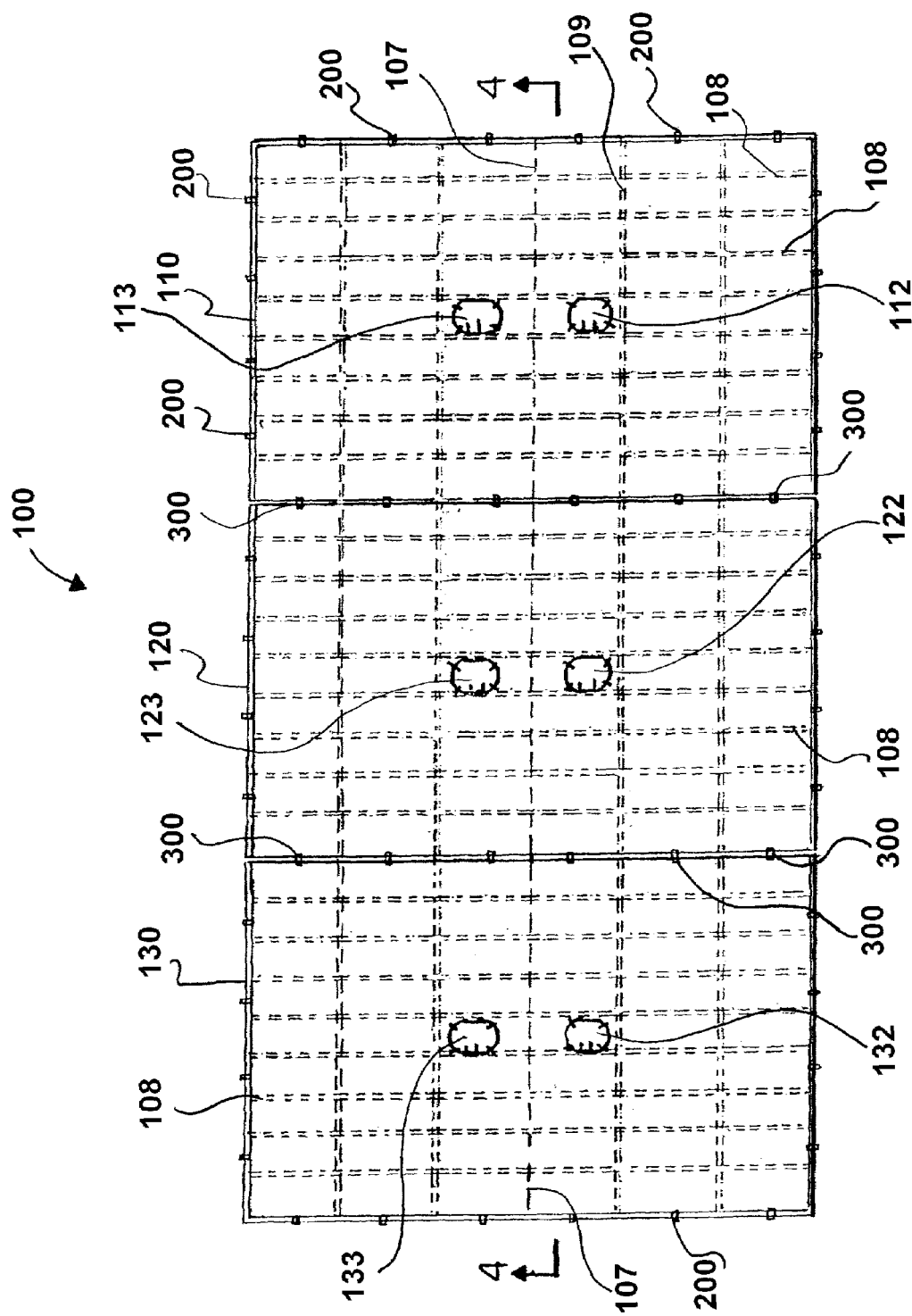
FIG. 3 is a top view of a cover which can be used on the barge of FIG. 1.
Figure 4:
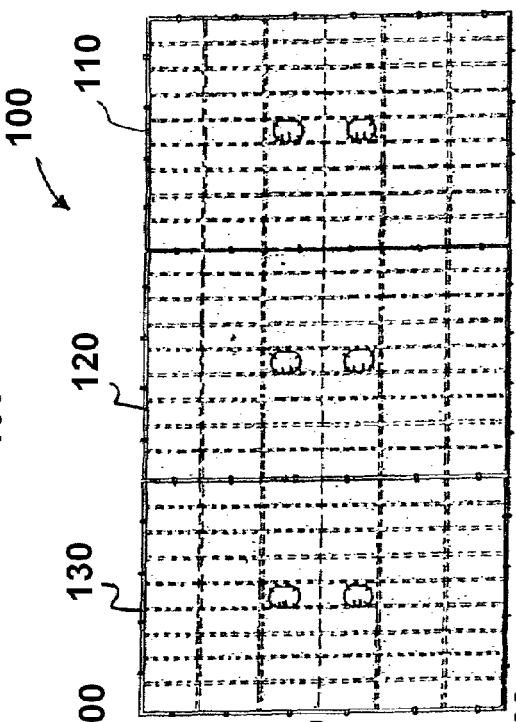
FIG. 4 is a section view taken along the line 4-4 of FIG. 3.
Figure 5:
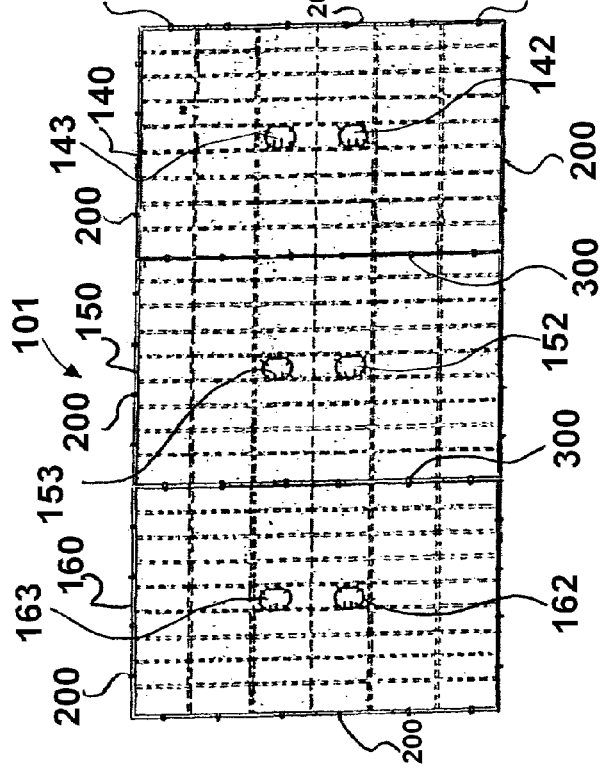
FIG. 5 is a top view of two covers which can be used on the barge of FIG. 1.

FIG. 1 is a top schematic view of a barge 10 which can be used in the method and apparatus of the present invention. FIG. 2 is a sectional view taken along the line 2-2 of FIG. 1. FIG. 3 is a top view of a cover 100 which can be used on barge 10. FIG. 4 is a sectional view taken along the line 4-4 of FIG. 3. FIG. 5 is a top view of two sections of cover 100 which can be used on barge 10.

Generally, barge 10 can comprise base 20, at least one compartment 30, and cover 100. Cover 100 can include at least one hatch 122. In FIG. 1, barge 10 is shown having two compartments 30,40 which are physically separated by space 36. Having more than one compartment is optional and separating the compartments by space 36 is also optional. Having two or more hatches 122, 123 is also optional.

In one embodiment cover 100 can be comprised of cover plates 110,120,130. Each cover plate can respectively include hatches 112 and 113; 122 and 123; and 132 and 133. In one embodiment cover 101 can be comprised of cover plates 140,150,160. Each cover plate can respectively include hatches 142 and 143; 152 and 153; and 162 and 163. Hatches 112,113,122,123,132,133,142,143,152,153,162,163 are shown being elliptical in shape, but can be any shape including polygonal, circular, rectangular, or square. Alternatively, only one hatch may be included. Also alternatively, two or more hatches per cover plate may be included. It is preferable that each hatch include a watertight seal.

Figure 3A:
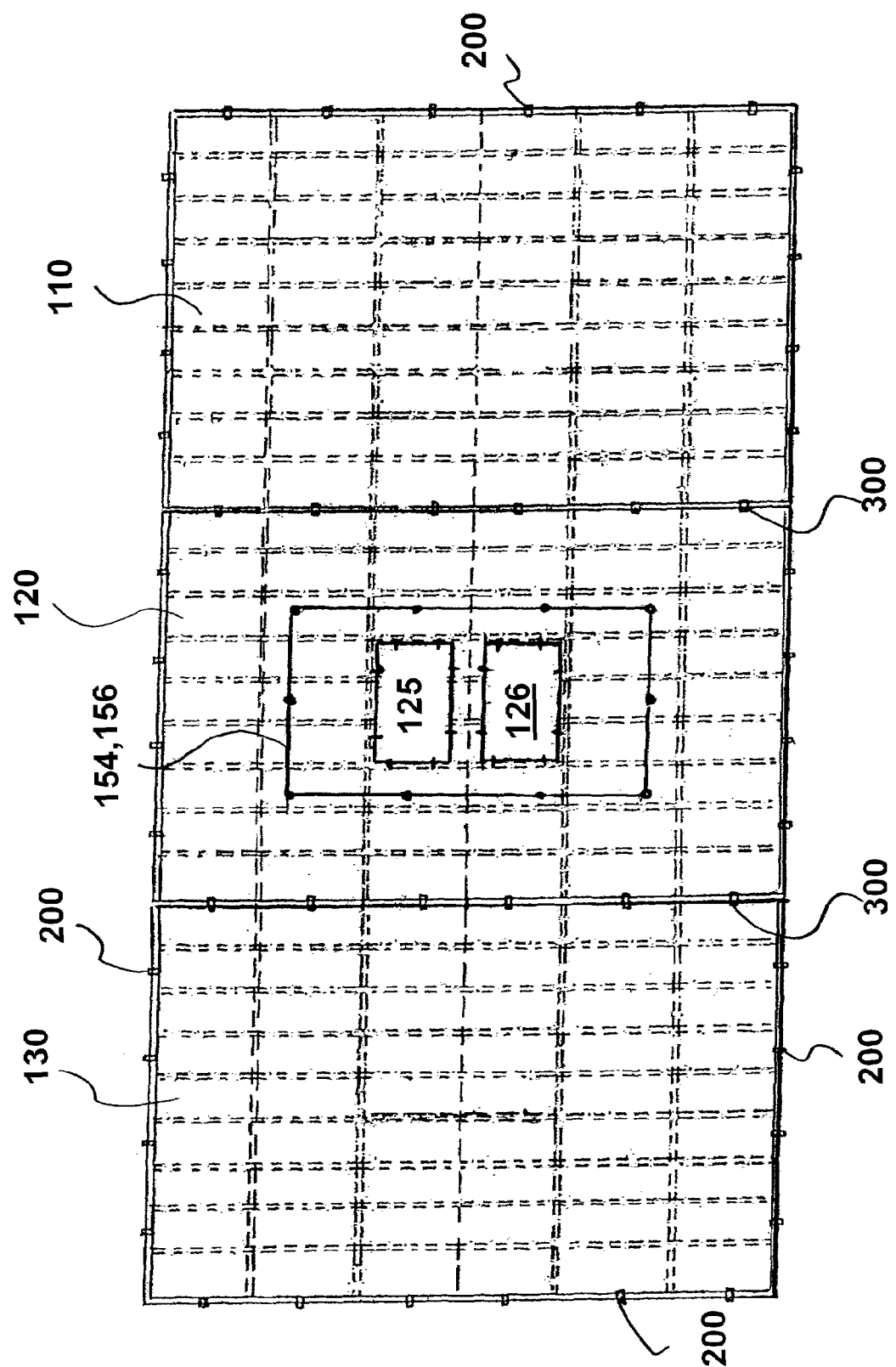
FIG. 3A is a top view of an alternative cover which can be used on the barge of FIG. 1.

In one embodiment the hatches can be rectangular of 4 feet by 6 feet (see FIG. 3A). A handrail 156 can be included on cover 100. Additionally, a secondary containment system 154 can be used around the plurality of hatches 125,126 so that spillage from discharge pipe 512 can be contained.

Including multiple cover plates reduces the weight which must be overcome in removing the cover plates. However, increasing the number of cover plates will increase the amount of watertight seals which are made at the joints (between cover plates). In one embodiment cover plates can be supported by a plurality of channel or angle supports 108 and channel or angle supports 109. In one embodiment cover plates can include a center support 107 (see FIGS. 2 through 5).

In one embodiment compartment 30 can be comprised of sub-compartments 32,34. Interior support 50 can separate compartment 30 into sub-compartments 32,34. Similarly, interior support 50 can separate compartment 40 into sub-compartments 42,44. FIG. 6 is an enlarged sectional view of interior support 50. Interior support 50 can comprise upper surface 52, inclined surface 53, and lower surface 54. Interior support 50 can support support 107.

FIG. 2 shows a side view of compartment 30. Compartment 30 can be comprised of sidewall 35, floor 38, and sidewall 37. Compartment 30 can include sub-compartments 32,34. Sidewalls 35,37 can be supported by supports 60, 62. Floor 38 can be supported by lower supports 64.

In one embodiment cover 100 can be detachably connected to compartment 30 through detaching a plurality of locks 200. In one embodiment lock 200 is constructed as shown in FIG. 7. Lock 200 can comprise base 210, pivot 212, member 214, threaded shaft 220, arm 230, and handle 240. Handle 240 can be threadably connected to threaded shaft 220 through threads 222. Threaded shaft 220 can be pivotally connected to base 210 through pivot 212. Base 210 can be connected to member 214. Seal 216 can be attached to member 214 or channel 102. Handle 240 can be turned in the direction of arrow 260 causing arm 230 to push down on cover 100 in the direction of arrow 250. Cover 100 can include channel 102 and, as cover 100 is pushed in the direction of arrow 250, seal 216 is squeezed between channel 102 and member 214 creating a watertight connection. To release cover 100, handle 240 is rotated in the opposite direction of arrow 260 allowing arm 230 to move in the opposite direction of arrow 250. When loosened handle 240 can be pulled back in the direction of arrow 270 (causing threaded shaft 220 to pivot in the same direction about pivot 212) which removes arm 230 from cover 100.

In an alternative embodiment cover 100 can be detachably connected to compartment 30 through detaching a plurality of locks 400 (taking the place of locks 200). In one embodiment lock 400 is constructed as shown in FIG. 7A. Lock 400 can comprise upper portion 410, chain 412, lower portion 420, ratcheting portion 430, connector 432, handle 434, and connector 436. Connector 420 can be attached to side wall 35. Connector 436 can be attached to connector 420, such as by welding. Upper portion 410 can be attached to cover 100 and include chain 412. Connector 432 can be detachably connectable to chain 412. Handle 434 can be used to ratchet down connector 432 to chain 412 and make a tight connection. To release cover 100, handle 434 can be ratcheted to loosen connector 432 from chain 412. The ratcheting portion 430 of connector 400 can then hang from lower portion 420.

In one embodiment cover plates (such as cover plates 110, 120) can be detachably connected to each other through detaching a plurality of locks 300. In one embodiment lock 300 is constructed as shown in FIG. 8. Lock 300 can comprise base 310, pivot 312, member 314, threaded shaft 320, arm 330, and handle 340. Handle 340 can be threadably connected to threaded shaft 320 through threads 322. Threaded shaft 320 can be pivotally connected to base 310 through pivot 312. Base 310 can be connected to member 314. Seal 316 can be attached to member 314 or channel 114. Handle 340 can be turned in the direction of arrow 360 causing arm 330 to push down on cover plate 110 in the direction of arrow 350. Cover plate 120 can include lock 300. Cover plate 110 can include channel 114 and as cover plate 110 is pushed in the direction of arrow 350 (and member 314 is pulled in the direction of arrow 380) causing seal 316 to be squeezed between channel 114 and member 314 creating a watertight connection. To release cover plates 110,120; handle 340 is rotated in the opposite direction of arrow 360 allowing arm 330 to move in the opposite direction of arrow 350. When loosened arm 340 can be pulled back in the direction of arrow 370 (causing threaded shaft 320 to pivot in the same direction about pivot 312) which removes arm 330 from cover plate 110.

In one embodiment cover 100 comprises at least one hatch 112 which can be opened and closed, and the first open state in step "c" occurs when hatch 112 is opened. In one embodiment cover 100 is detachably connected to the barge 10, and the second open state in step "g" occurs when cover 100 is removed from barge 10 (such as by a crane 550). In another embodiment the first open state occurs when cover 100 is removed from barge 10 (such as by a crane 550). In one embodiment, cover 100 comprises a plurality of hatches 125, 126 which can be rectangular of 4 feet by 6 feet. In one embodiment during step "h" the cuttings 520 are scooped out of the storage area 30. In one embodiment a bucket 560 or backhoe 561 is used to scoop out the cuttings 520. In one embodiment during step "h" the cuttings 520 are dug out of the storage area 30. In one embodiment cover 100 is detachably connected to the storage area 30 by a plurality of anchors or locks 200. In one embodiment cover 100 comprises a plurality of pad eyes 560 which can be used to lift the cover 100.

In one embodiment cover 100 comprises a plurality of sections 110,120,130, each section being connected to the at least one storage area by a plurality of anchors or locks 200. In one embodiment the plurality of sections 110,120,130 are detachably connected to at least one other of the plurality of sections and seals 316 are used to seal the connection area between the detachably connected sections. In one embodiment there exists a watertight seal 216 between the storage area 30 and the cover 100. In one embodiment the first and second open states occur when at least one of the sections are removed from barge 10. In another embodiment either the first or second open states occurs when at least one of the sections are removed from barge 10.

In one embodiment cover 101 comprises a plurality of sections 140,150,160, each section being connected to the at least one storage area by a plurality of anchors or locks 200 (or locks 400). In one embodiment the plurality of sections 140,150,160 are detachably connected to at least one other of the plurality of sections and seals 316 are used to seal the connection area between the detachably connected sections. In one embodiment there exists a watertight seal 216 between the storage area 40 and the cover 101. In one embodiment the first and second open states occur when at least one of the sections are removed from barge 10. In another embodiment either the first or second open states occurs when at least one of the sections are removed from barge 10.

In one embodiment cover 100 is rotatably connected to the at least one storage area 30. In one embodiment the cover 100 is slidably connected to the at least one storage area 30. For example cover plate 120 can slide under or over cover plate 130 to open storage area 30.

In one embodiment, compartments 30,40 occupy at least fifty percent of the area of barge 10. In another embodiment, compartments 30,40 occupy between about fifty percent to ninety five percent of the area of barge 10. In another embodiment, compartments 30,40 occupy between fifty and seventy five percent of the area of barge 10. In another embodiment, compartments 30,40 occupy between seventy five and ninety five percent of the area of barge 10.

Method

One embodiment includes a method of disposing of drill cuttings 500 from an oil and/or gas well drilling platform 510, comprising: (a) transporting the drill cuttings 520 to a cuttings collection area 530 on the platform 510; (b) providing a barge 10, the barge 10 having at least one storage area 30 (which may be integrally formed with barge 10), a cover 100 operably connected to the at least one storage area 30, and covering the at least one storage area 30; (c) placing the cover 100 in a first open state so that cuttings 500 can be placed in the at least one storage area 30; (d) transporting the drill cuttings 500 from the cuttings collection area 530 to the at least one storage area of the barge 10; (e) placing the cover 100 in a closed state so that the cuttings 520 in the storage area 30 of the barge 10 are contained; (f) transporting the barge 10 from the drilling platform 510 to a collection site 540; (g) placing the cover 100 in a second open state so that the cuttings 520 in the storage area 30 can be removed; and (h) removing the cuttings 520 from the storage area 30.

Figure 9:
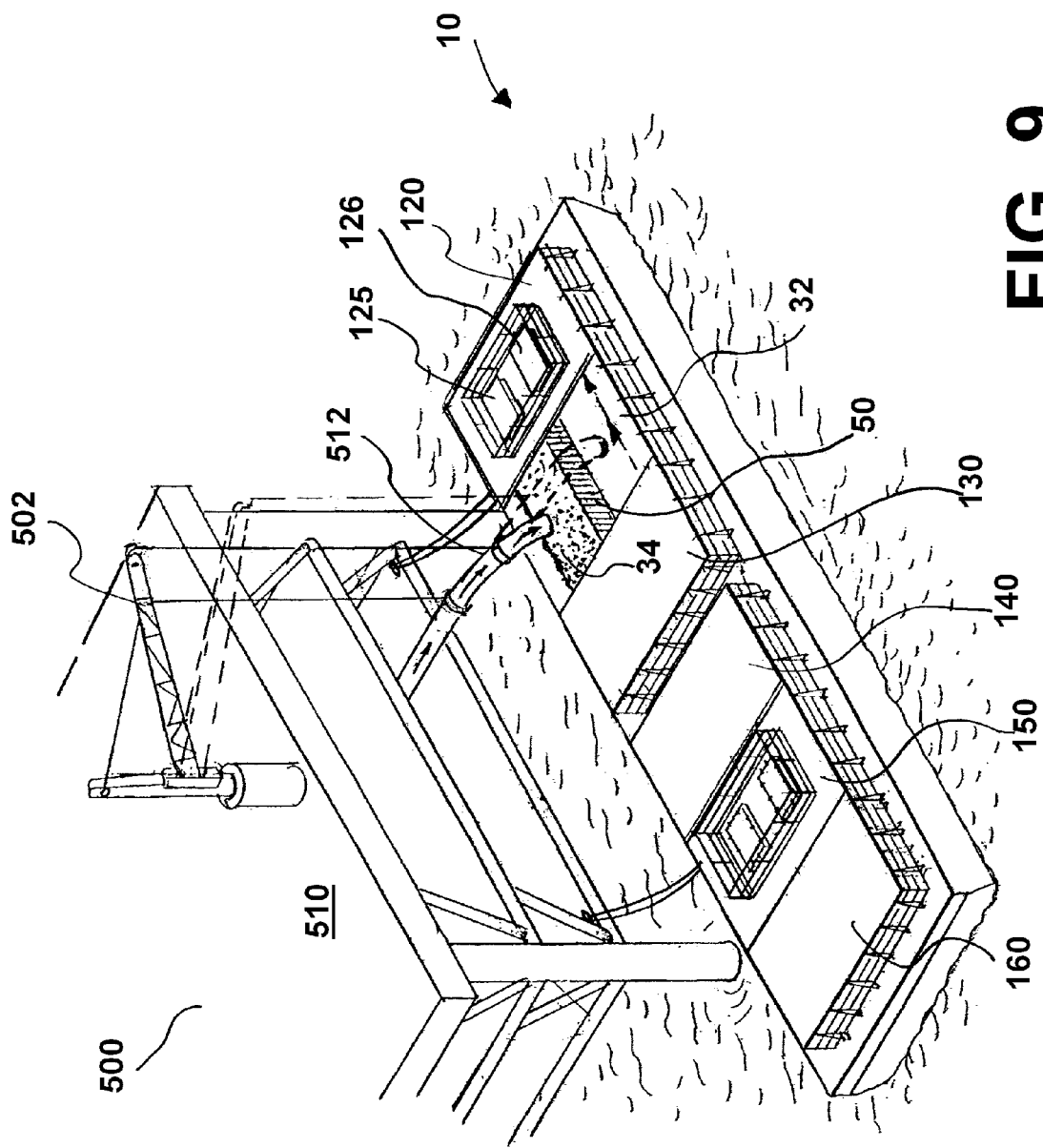
FIG. 9 is a perspective view of a discharge pipe after it has filled one of the sub-compartments (with a portion of the cover removed)
Figure 10:
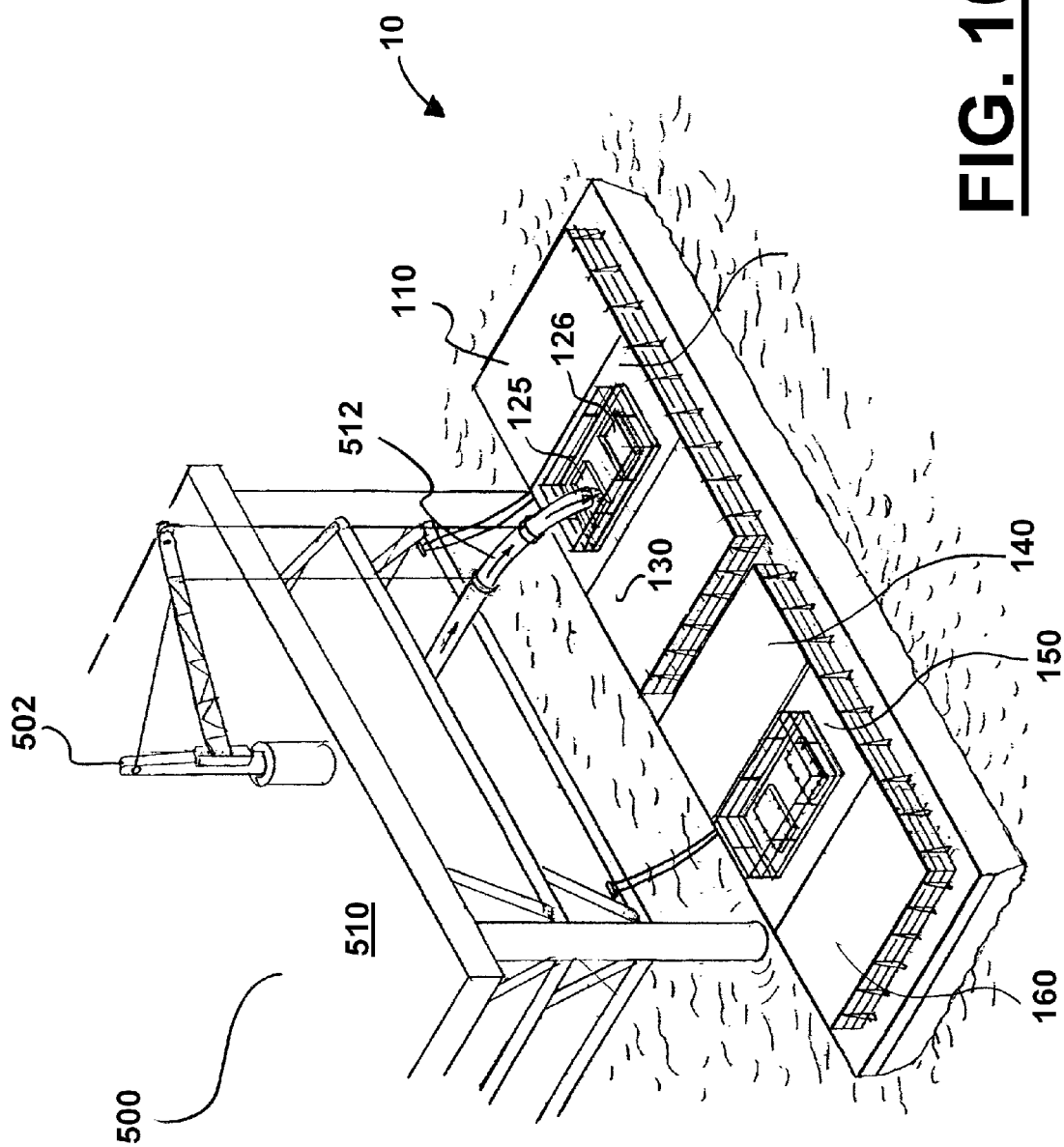
FIG. 10 is a perspective view of a discharge pipe filling one of the sub-compartments (through a hatch cover opening)

FIG. 9 is a perspective view of a discharge pipe 512 after it has filled one of the sub-compartments 32 (with middle section 120 of cover 100 removed and placed on side cover plate 110). Also shown is wall 50 and empty sub-compartment 34. After completion of the filling of sub-compartment 32, discharge pipe 512 can be located to fill sub-compartment 34—as indicated by the phantom lines in FIG. 9. While sub-compartments 32,34 are being filled, middle cover 120 has been removed and placed on top of side cover plate 110. FIG. 10 is a perspective view of discharge pipe 512 filling subcompartment 32 through hatch 125. After filling sub-compartment 32, sub-compartment 34 can be filled through hatch 126. Alternatively, one or more openings can be included in wall 50 to allow movement between sub-compartments 32 and 34. Also alternatively wall 50 can be removed completely. In such alternative embodiments a single hatch could be used to fill compartment 30.

In one embodiment discharge pipe 512 can be operably connected to barge 10 through a connection to one of the hatches. This connection can be a swivel type quick connection or a funnel connection. The connection should allow for differential movement between barge 10 and rig 500 depending on the sea conditions. Operably connecting discharge pipe 512 saves time and reduces the risk of spillage.

After being filled barge 10 can be taken to an ultimate disposal or recycling site or to a transfer station where its contents can be transferred to means to transport the contents to the ultimate disposal or recycling site. A tug 600 can be used to move barge 10 to a desired location.

Figure 11:
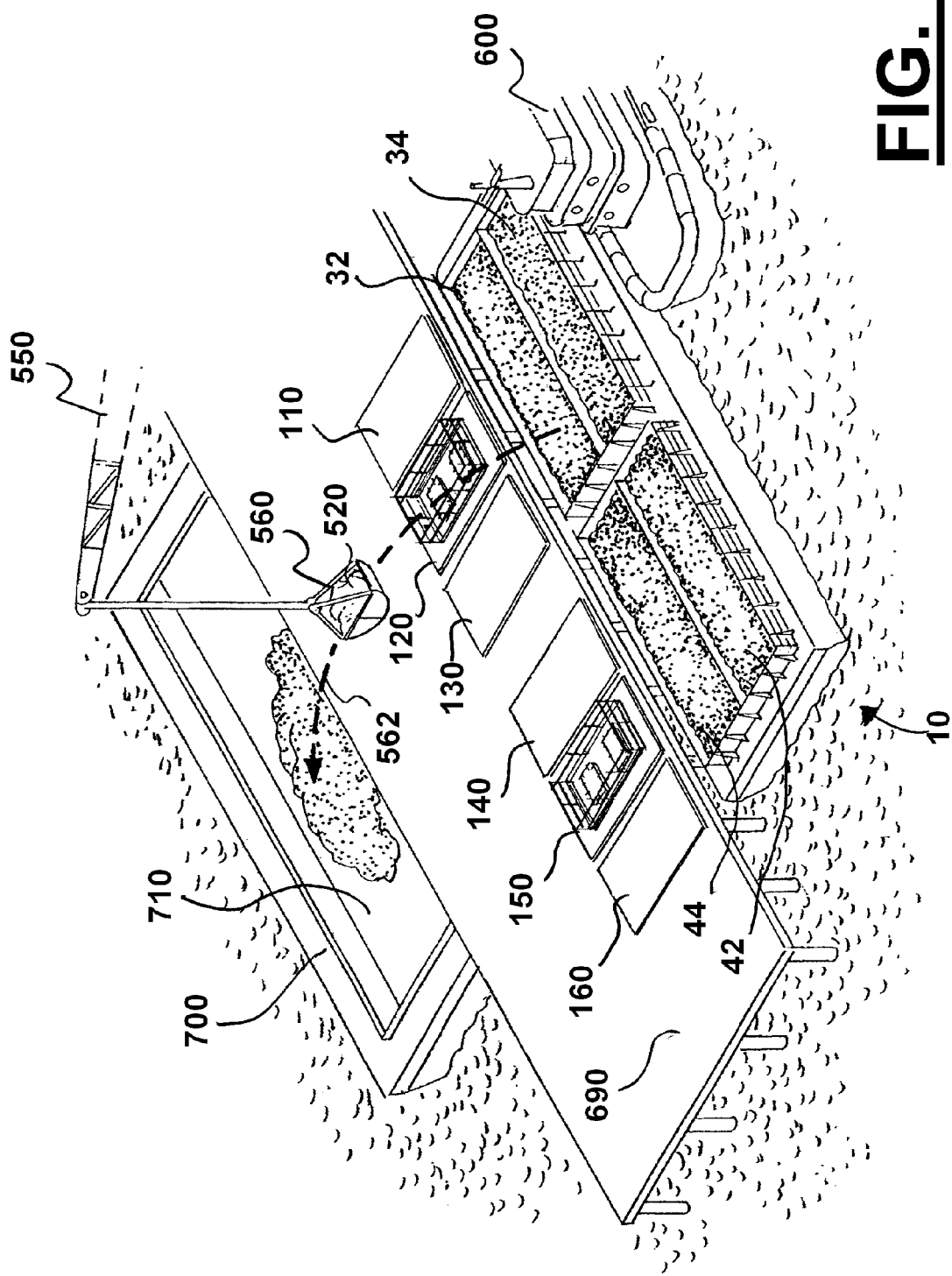
FIG. 11 is a perspective view of a barge being unloaded at a transfer station where its contents are being transferred to a transfer barge.
Figure 12:
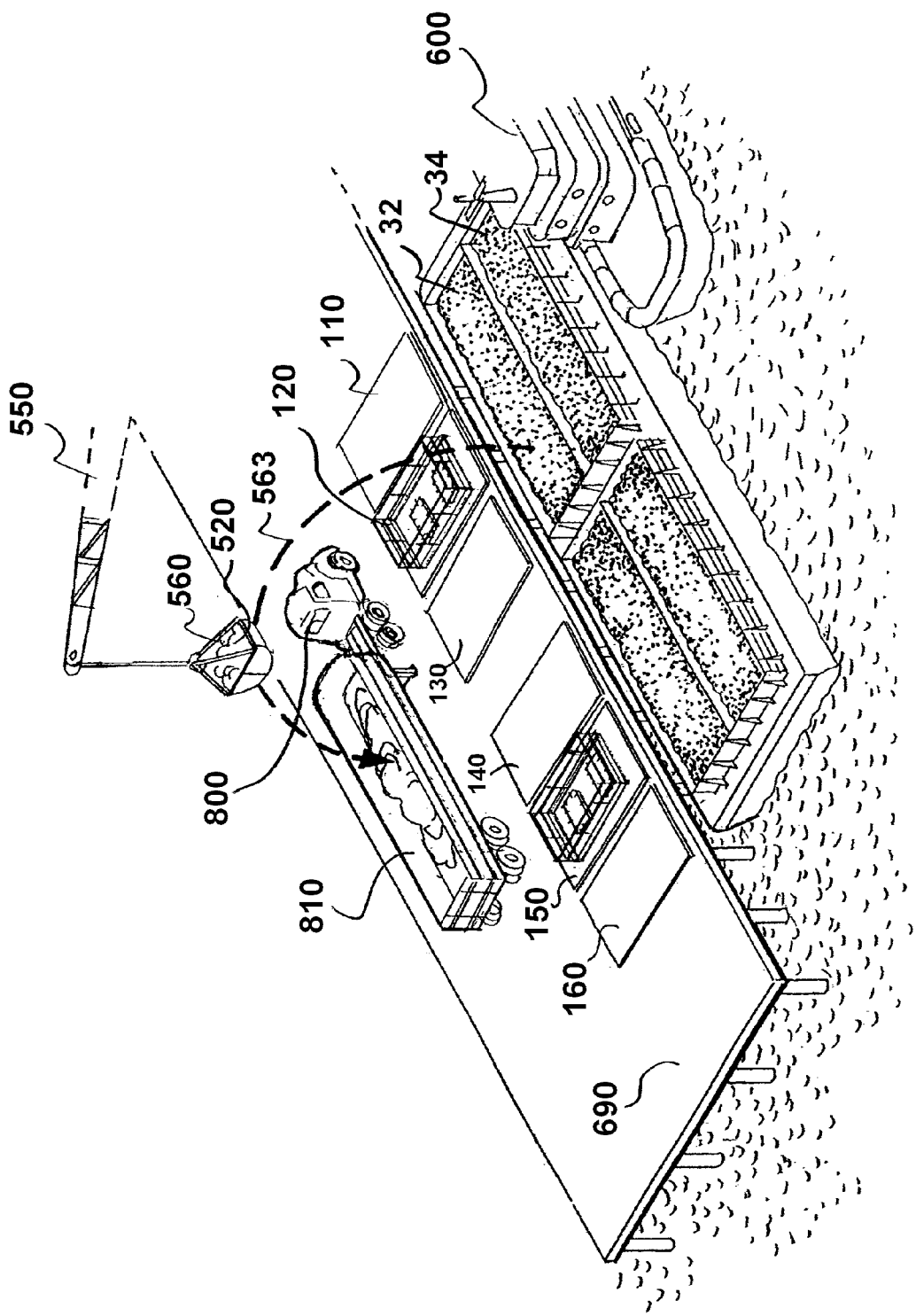
FIG. 12 is a perspective view of a barge being unloaded at a transfer station where its contents are being transferred to a truck.

FIG. 11 is a perspective view of barge 10 being unloaded at transfer station 690 where its contents are being transferred to transfer barge 700. FIG. 12 is a perspective view of barge 10 being unloaded at transfer station 690 where its contents are being transferred to a truck 800. To remove covers 101,102 the plurality of locks 200 or 400 (depending on the locking embodiment chosen) can be loosened. Crane 550 can be used to remove covers 101 and 102 from barge 10 and place covers 101,102 on transfer station 690. Cover plates 110,120,130, 140,150,160 are shown in FIGS. 11 and 12 on transfer station 690.

Various methods can be used to remove the contents of barge 10. In FIGS. 11 and 12 a clam bucket 560 is shown unloading barge 10. Clam bucket 560 can be controlled by crane 550. Clam bucket 560 can scoop out a portion of material, such as drill cuttings 520. In FIG. 11, transfer barge 700 is shown being located on the opposite side of transfer station 690. Although not shown a tray 730 can be placed between barge 10 and transfer station 690 to catch any spillage from clam bucket 560. Alternatively, transfer barge can be located adjacent to barge 10. Spanning between top 720 of transfer barge 700 and barge 10 can be tray 730. Tray 730 can include splash guard 740. Tray 730 catches any material such as drill cuttings 520 which might spill from clam bucket 560. Tray 730 is shown angled toward barge 10 so that spilled material will flow back to barge 10, however, tray 730 could also be angled toward transfer barge 700. After being filled transfer barge 700 can be moved to an ultimate disposal site, such as a land fill, land farm, or injection well.

As shown in FIG. 12, truck 800 can be filled with the contents of barge 10. After being filled transfer truck 800 can driven to an ultimate disposal site, such as a land fill, land farm, or injection well. In one embodiment multiple trucks can be used to empty barge 10. In one embodiment both trucks and transfer barges can be used to empty barge 10.

In an alternative embodiment a backhoe 561 can be used to empty all or part of the contents of barge 10. In an alternative embodiment at least part of barge 10 is emptied by pumping out its contents. In one embodiment both pumping and bucket 560 are used. In an alternative embodiment at least part of barge 10 is manually emptied, such as by shovels.

In an alternative embodiment, barge 10 can be moved by tug boat 600 to the ultimate disposal site for unloading.

After being emptied, covers 101,102 can again be placed on barge 10, such as by crane 550. In one embodiment covers 101,102 are locked down for further transport of barge 10.

The following is a list of reference numerals:

LIST FOR REFERENCE NUMERALS

| (Reference) | (Description) |
|---|---|
| 10 | barge |
| 20 | base |
| 30 | compartment |
| 32 | sub-compartment |
| 33 | wall |
| 34 | sub-compartment |
| 35 | wall |
| 36 | space |
| 37 | wall |
| 38 | floor |
| 40 | compartment |
| 42 | sub-compartment |
| 44 | sub-compartment |
| 50 | interior support |
| 52 | upper surface |
| 53 | inclined surface |
| 54 | lower surface |
| 60 | support |
| 62 | support |
| 64 | lower support |
| 100 | cover |
| 101 | cover |
| 102 | channel |
| 104 | section of cover |
| 106 | section of cover |
| 107 | support |
| 108 | channel or angle support |
| 109 | channel or angle support |
| 110 | cover plate |
| 112 | hatch |
| 113 | hatch |
| 120 | cover plate |
| 122 | hatch |
| 123 | hatch |
| 124 | containment ring |
| 125 | hatch |
| 126 | hatch |
| 130 | cover plate |
| 132 | hatch |
| 133 | hatch |
| 134 | vent |
| 140 | cover plate |
| 142 | hatch |
| 150 | cover plate |
| 152 | hatch |
| 154 | secondary containment |
| 156 | guard rail |
| 160 | cover plate |
| 162 | hatch |
| 200 | lock |
| 210 | base |
| 212 | pivot |
| 214 | member |
| 216 | seal |
| 220 | threaded shaft |
| 222 | threads |
| 230 | arm |
| 240 | handle |
| 250 | arrow |
| 260 | arrow |
| 270 | arrow |
| 300 | lock |
| 310 | base |
| 312 | pivot |
| 314 | member |
| 316 | seal |
| 320 | threaded shaft |
| 322 | threads |
| 330 | arm |
| 340 | handle |
| 350 | arrow |
| 360 | arrow |
| 370 | arrow |
| 380 | arrow |
| 400 | lock |
| 410 | upper portion |
| 412 | chain |
| 416 | seal |
| 420 | lower portion |
| 430 | ratcheting portion |
| 432 | connector |
| 434 | handle |
| 436 | connector |
| 500 | rig |
| 502 | rig crane |
| 510 | platform |
| 512 | discharge pipe |
| 520 | drill cuttings |
| 530 | collection area |
| 540 | collection site |
| 550 | crane |

-continued

LIST FOR REFERENCE NUMERALS

| (Reference) | (Description) |
|---|---|
| 560 | bucket |
| 561 | backhoe |
| 562 | arrow |
| 563 | arrow |
| 600 | tug boat |
| 610 | arrow |
| 690 | transfer station |
| 700 | transfer barge |
| 710 | open compartment |
| 720 | top |
| 730 | tray |
| 740 | splash guard |
| 800 | truck |

All measurements disclosed herein are at standard temperature and pressure, at sea level on Earth, unless indicated otherwise. All materials used or intended to be used in a human being are biocompatible, unless indicated otherwise.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

We claim:

1. A method of disposing of drill cuttings from an oil and/or gas well drilling platform, comprising:
   (a) providing a barge having an upper level with an area, the barge having at least one storage compartment, with upper and lower portions, and the upper portion of the at least one storage compartment having an inlet with an inlet area and a cover operably connected to and covering the inlet of the at least one storage compartment, the cover having multiple cover sections that are positioned side by side when covering the inlet;
   (b) placing the at least one storage compartment in a first open state by removing at least one but not all cover sections from the inlet;
   (c) receiving through the inlet cuttings in the barge's at least one storage compartment, the cuttings being received from the drilling platform;
   (d) after step "c", placing the at least one storage compartment in a closed state by replacing any cover sections removed in step "b" so that the cuttings in the storage compartment are contained;
   (e) transporting the barge from the drilling platform to a collection site;
   (f) placing the at least one storage compartment in a second open state by removing from the inlet of the at least one storage compartment more of the cover sections than were removed in step "b" so that the cuttings in the barge's at least one storage compartment can be removed, the second open state having a larger open area compared to the first open state; and
   (g) removing through the inlet the cuttings from the barge's at least one storage compartment.

2. The method of disposing of drill cuttings of claim 1, wherein in step "a" the cover comprises a plurality of cover plate sections which are detachably connected to the at least one storage area, and the first open state in step "b" occurs when one of the cover plate sections are detached from the at least one storage area and placed on top of another cover plate section.

3. The method of disposing of drill cuttings of claim 2, wherein the second open state in step "f" occurs when the plurality of cover sections are removed from the inlet of the at least one storage area.

4. The method of disposing of drill cuttings of claim 2, wherein the plurality of cover plate sections are detachably connected to each other.

5. The method of disposing of drill cuttings of claim 4, wherein a watertight seal is maintained between the plurality of cover plate sections.

6. The method of disposing of drill cuttings of claim 1, wherein in step "f" cover includes a plurality of cover plate sections and, to enter the second open state, each of these cover plate sections are removed from the barge and placed at the collection site.

7. The method of disposing of drill cuttings of claim 1, further including the step, after step "h", of placing the now empty at least one storage area in a closed state for further transport.

8. The method of disposing of drill cuttings of claim 1, wherein in step "a", the cover includes three cover plate sections detachably connected to each other and maintaining a watertight seal between each other.

9. The method of disposing of drill cuttings of claim 8, wherein the detachable connection and water tight seal between the cover plate sections is maintained by a plurality of locking members detachably connecting the cover plate sections.

10. The method of disposing of drill cuttings of claim 1, wherein in step "a", the cover includes a hatch.

11. The method of disposing of drill cuttings of claim 1, wherein in step "a" the cover includes a hatch with a secondary containment section around the hatch, and a handrail surrounding the hatch.

12. The method of claim 1, wherein in step "h" the cuttings are scooped out of the at least one storage area.

13. The method of claim 1, wherein the barge in step "a" has an upper barge area, and in step "f" the larger open area of the inlet for the second open state is at least fifty percent of the upper barge area.

14. The method of claim 13, wherein the larger open area of the inlet is between fifty and ninety five percent of the upper barge area.

15. The method of claim 13, wherein the larger open area of the inlet is between seventy five and ninety five percent of the upper barge area.

16. A method of disposing of drill cuttings from an oil and/or gas well drilling platform, comprising:
   (a) providing a barge, the barge having at least one storage area, a cover operably connected to the at least one storage area and covering the at least one storage area, the cover including a plurality of cover plate sections which are detachably connectable to each other forming a water tight seal;
   (b) placing the at least one storage area in a first open state by detaching at least one of the plurality of cover plate sections, wherein one cover plate section is detached and placed on top of one of the other cover plate sections;

(c) receiving cuttings in the barge's at least one storage area, the cuttings being received from the drilling platform;

(d) placing the at least one storage area in a closed state by reattaching the at least one cover plate section removed in step "b" to the at least one storage area so that the cuttings in the storage area are contained;

(e) transporting the barge from the drilling platform to a collection site;

(f) placing the at least one storage area in a second open state by detaching a plurality of the plurality of cover plate sections so that the cuttings in the barge's at least one storage area can be removed;

(g) removing the cuttings from the barge's at least one storage area; and (h) during steps "b" through "g" the at least one storage area is at atmospheric pressure.

17. The method of claim 16, wherein in step "a" the cover includes three plate sections placed side by side, and in step "b" the middle cover plate section is detached and placed on one of the other two cover plate sections.

18. The method of claim 16, wherein in step "f" each of the plurality of cover plate sections are detached from the at least one storage area and from each other to place the at least one storage area in the second open state.

19. The method of claim 16, wherein at least one of the cover plate sections includes a hatch.

20. The method of claim 16, wherein each of the cover plate sections includes a hatch.

21. The method of disposing of drill cuttings of claim 16, wherein in step "a" at least one of the cover plate sections includes a hatch with a secondary containment section around the hatch, and a handrail surrounding the hatch.

22. A method of disposing of drill cuttings from an oil and/or gas well drilling platform, comprising:

(a) providing a barge, the barge having first and second storage areas, a first cover comprising a plurality of cover plates operably connected to the first storage area and covering the first storage area, a second cover comprising a plurality of cover plates that are positioned side by side and operably connected to the second storage area and covering the second storage area;

(b) placing the first storage area in a first open state by removing one or more cover plates so that cuttings can be placed in the first storage;

(c) placing the second storage area in a first open state so that cuttings can be placed in the second storage area;

(d) receiving cuttings in the barge's first and second storage areas from the drilling platform;

(e) placing the first and second storage areas in closed states so that the cuttings in these storage areas are contained;

(f) transporting the barge from the drilling platform to a collection site;

(g) placing the first and second storage areas in second open states so that the cuttings can be removed, the second open states having a larger open areas compared to the first open state wherein more of the cover plates are removed in the second open state then were removed in step "b";

(h) removing the cuttings from the barge's first and second storage areas; and (i) during steps "b" through "h" the first and second storage areas are at atmospheric pressure.

* * * * *